United States Patent [19]

Otsuka et al.

[11] 4,214,289
[45] Jul. 22, 1980

[54] STABILIZING EQUIPMENT FOR POWER TRANSMISSION SYSTEM

[75] Inventors: Kei Otsuka; Masamichi Shigehara; Sumio Yokokawa, all of Kawasaki, Japan

[73] Assignee: Fuji Electric Co., Ltd., Kawasaki, Japan

[21] Appl. No.: 902,919

[22] Filed: May 4, 1978

[30] Foreign Application Priority Data

May 24, 1977 [JP] Japan .................................. 52-60210

[51] Int. Cl.² .............................................. H02H 7/06
[52] U.S. Cl. ....................................... 361/20; 361/58; 361/111; 322/8
[58] Field of Search ..................... 361/20, 21, 58, 51, 361/110, 111, 9, 10, 11; 322/8, 27, 23, 37, 24, 25; 307/86

[56] References Cited

U.S. PATENT DOCUMENTS

| | | | |
|---|---|---|---|
| 2,300,935 | 11/1942 | Kovalsky | 361/20 |
| 3,098,190 | 7/1963 | Spencer, Jr. et al. | 361/51 X |
| 3,234,397 | 2/1966 | Park | 322/8 X |
| 4,042,963 | 8/1977 | Kriechbaum | 361/58 X |
| 4,051,545 | 9/1977 | Kloss | 361/56 X |

FOREIGN PATENT DOCUMENTS

2503034 7/1976 Fed. Rep. of Germany ............ 361/20

Primary Examiner—Patrick R. Salce
Attorney, Agent, or Firm—Spencer & Kaye

[57] ABSTRACT

A stabilizing equipment for a power transmission system having a power source system, at least one transmission line and at least one line circuit breaker inserted between the power source system and the transmission line for interrupting the transmission line when a fault occurs thereon. The stabilizing equipment comprises a fault detector for detecting the fault, a series damping resistor, first means for inserting the series damping resistor between the power source system and the line circuit breaker before the line circuit breaker is opened and after the fault is detected by the fault detector, a parallel damping resistor, second means for inserting the parallel damping resistor between the power source system and ground after the line circuit breaker is opened, and third means for separating the parallel damping resistor first and subsequently the series damping resistor before the line circuit breaker is reclosed after reclosing conditions are satisfied. According to this invention, the transient stability of the power transmission system is improved even if the transmission line is interrupted long after the occurrence of the fault, for example, by a back up protective relay.

18 Claims, 9 Drawing Figures

STABILIZING EQUIPMENT FOR POWER TRANSMISSION SYSTEM

BACKGROUND OF THE INVENTION

1. Field of the Invention

The present invention relates to a stabilizing equipment having damping resistors for improving the stability of power transmission systems.

2. Prior Art

In recent years there has been a tendency toward the development of power transmission systems using long-distance and large capacity transmission lines. This has occurred because stations are apt to be located far from the consumer loads and to have increased power generating capacities. As a result, improved stability of power transmission systems has been an important requirement. While there are various ways of improving the power transmission system, considerable attention has been paid to the so-called damping resistor system from the viewpoint of effectiveness and economy of the power transmission system. In this damping resistor system, a damping resistor for suppressing the acceleration of a generator in the power source system is inserted between the terminals of the power source system at the time that a fault such as ground fault occurs in the power transmission system, so that the transient stability of the system is increased.

In such a stabilizing equipment of the prior art, however, the damping resistor inserted between the terminals of the power source is connected in parallel with a transmission line, and therefore it is necessary that the damping resistor be connected to the power source system after a faulted line is interrupted by circuit breakers. Otherwise, the above-mentioned effect whereby the system stability is increased cannot be attained. In the case where a main protective relay operates normally in a high speed protective equipment, the damping resistor is connected to the power source system when a faulted line is interrupted soon after the fault occurs. This means that the damping resistor is connected to the power source system shortly after the fault occurs, and accordingly the damping resistor improves the stability of the power transmission system. On the other hand, if the main protective relay fails to operate, a back up protective relay operates to interrupt the faulted line with a long time delay after the fault occurs and the damping resistor is connected to the power source system when the faulted line is interrupted. This means that the damping resistor is not connected to the power source system until the circuit breaks are opened long after the fault occurs and therefore the connection of the damping resistor does not show the above-mentioned improvement of the stability when the back up protective relay operates.

SUMMARY OF THE INVENTION

With the above in view, it is an object of the present invention to provide an improved stabilizing equipment for power transmission systems having the effect of increasing the transient stability of the power transmission systems, even if a power transmission line is interrupted by a back up protective relay because a main protective relay fails to operate.

It is a further object of this invention to provide an improved stabilizing equipment wherein a first damping resistor is inserted between a power source or generator and a faulted line after a line faulted is detected and before the faulted line is interrupted and a second damping resistor is connected to the power source in parallel with the faulted line after the faulted line is interrupted, so that the transient stability of the power transmission system is increased when circuit interruption is effected by both the main and back up protection.

It is a still further object of this invention to provide an improved stabilizing equipment wherein one damping resistor functions as the first and second damping resistors, so that the cost of the equipment is reduced.

It is a still further object of this invention to provide an improved stabilizing equipment wherein the damping resistors are arranged to be connected to respective phases of each line, so that the stability of the transmission line is increased, even if an unbalanced line fault occurs.

With these objects in mind, the following description, by way of nonlimiting embodiments of this invention, is given in conjunction with the following drawings.

DESCRIPTION OF THE PREFERRED EMBODIMENTS

A system stabilizing equipment of the prior art will be explained with reference to FIG. 1, in which a power transmission system has a power source system G consisting of a single or plural generators and two power transmissions lines L1 and L2 which are connected to the power source system G through respective line circuit breakers LCB1 and LCB2. A damping resistor DBR is connected to the power source system G through a resistor circuit breaker RCB is parallel with and in common to the first and second power transmission lines L1 and L2. The line circuit breakers LCB1 and LCB2 and the resistor circuit breaker RCB are controlled as follows; when a line fault occurs on either one of the transmission lines L1 and L2, a protective relay equipment PR operates in such a way that the line circuit breaker LCB1 and LCB2 of the fault line is tripped by the protective relay equipment PR to separate the fault line from the power source system G and at the same time the resistor circuit breaker RCB is closed to connect the damping resistor DBR to the terminal of the power source system G in parallel with the transmission lines L1 and L2.

In this way, the damping resistor DBR works to compensate for an output variation of the power source system G which is caused by the separation of the faulted line, so that the acceleration of each generator included in the power source system G is suppressed. As a result, the stabilizing equipment of the prior art shown in FIG. 1 can maintain stable operation of the power transmission system.

In this stabilizing equipment, the damping resistor DBR is connected to the power source system G in parallel with the transmission lines L1 and L2 after the line circuit breaker LCB1 and LCB2 breaks the faulted line. This means that this stabilizing equipment does not function to improve the stability in the event the line circuit breaker LCB1 and LCB2 is not interrupted soon after the fault occurs; this being the case when the main protective relay fails to work because of its failure and the back up protective relay operates to interrupt the line circuit breaker LCB1 or LCB2.

In order to obviate the above-mentioned disadvantage of the prior art, a stabilizing equipment according to this invention employs a first or series damping resistor which is connected in series with the transmission line after a line faulted is detected on that line and before the faulted line is broken and a second or parallel damping resistor which is connected in parallel to the transmission line after the faulted line is interrupted, so that the transient stability is improved even if the protective relay equipment does not operate soon after the line fault occurs.

Figure 1:
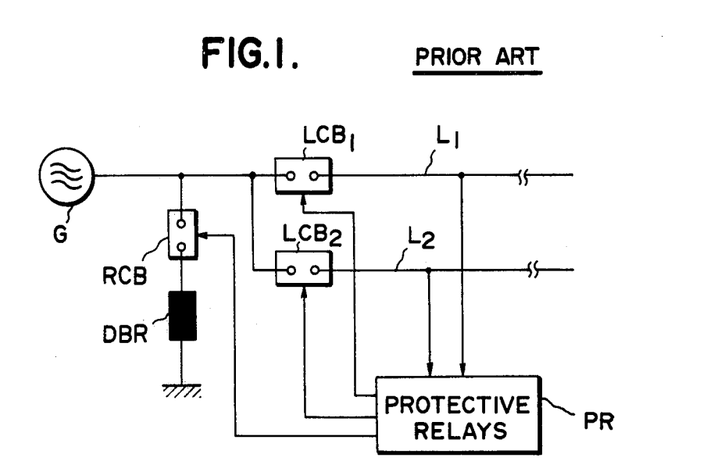
FIG. 1 is a single line connection diagram showing a stabilizing equipment of the prior art.
Figure 2:
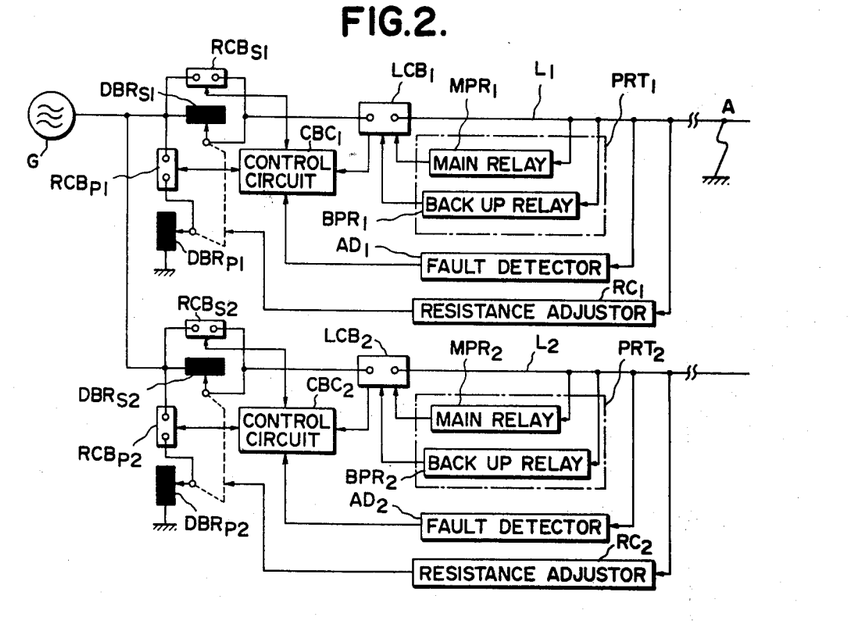
FIG. 2 is a single line connection diagram showing a first embodiment of this invention.

A first embodiment of the present invention is shown in FIG. 2, in which a power transmission system is arranged in the same manner as in FIG. 1 and therefore the same reference codes denote the corresponding parts of the power transmission system. In FIG. 2, a series damping resistor DBRS1 is inserted between the power source system G and the line circuit breaker LCB1. A series resistor circuit breaker RCBS1 is connected in parallel with the damping resistor DBRS1. A series circuit of a parallel resistor circuit breaker RCBP1 and a parallel damping resistor DBRP1 is connected to the power source system G in parallel with the parallel circuit of the series resistor circuit breaker RCBS1 and the series damping resistor DBRS1. The series damping resistor DBRS1 is connected in series with the first transmission line L1 when the series resistor circuit breaker RCBS1 is tripped. The parallel damping resistor DBRP1 is connected in parallel to the transmission line L1 when the parallel resistor circuit breaker RCBP1 is closed. The resistance values of the respective damping resistors DBRS1 and DBRP1 are adjustable via adjusting terminals thereof in an interlocked manner by a resistance adjustor RC1. The resistance adjustor RC1 detects the transmitted power through the line L1 and adjusts the resistance values of the damping resistors DBRS1 and DBRP1 in accordance with the transmitted power so that these resistance values correspond to the transmitted power of the line L1.

The resistor circuit breakers RCBS1 and RCBP1 are controlled by a circuit breaker control circuit CBC1 which receives a trip detection signal from a tripping mechanism (not shown) of the line circuit breaker LCB1, which receives a tripping command from a main protective relay MPR1 or a back up protective relay BPR1 of a protective relay equipment PRT1. The control circuit CBC1 receives also a fault detection signal from a fault detector AD1. The protective relay equipment PRT1 receives a line voltage value and a line current value for detecting a fault on the transmission line L1. When the protective relay equipment PRT1 detects a line fault, the tripping command is produced normally from the main protective relay MPR1 and is applied to the line circuit breaker LCB1. If, for some reason, the main protective relay MPR1 fails to operate in a normal manner, the back up protective relay BPR1 produces the tripping command which is applied to the line circuit breaker LCB1. The fault detector AD1 is preferably an overcurrent relay, an undervoltage relay or the like for detecting a transmission line fault.

When the transmission line L1 is working under normal conditions, the circuit breaker control circuit CBC1 keeps the series resistor circuit breaker RCBS1 closed so that the series damping resistor DBRS1 remains short-circuited, and at the same time the control circuit CBC1 keeps the parallel resistor circuit breaker RCBP1 open so that the parallel damping resistor DBRP1 is disconnected from the line. Aa a result, under normal working conditions of the transmission line L1, both damping resistors DBRS1 and DBRP1 are not connected to the line L1.

When a fault occurs at some point of the transmission line L1, the fault detector AD1 detects the fault and supplies a fault detection signal to the control circuit CBC1, which then produces the tripping command so as to trip or open the series resistor circuit breaker RCBS1. When the tripping command is derived from the protective relay equipment PRT1, the line circuit breaker LCB1 is tripped and the control circuit CBC1 produces the closing command so as to connect the parallel damping resistor DBRP1 to the generator G through breaker RCBP1. Accordingly, once the line fault occurs, the series damping resistor DBRS1 is inserted between the power source system G and the line L1 before the line circuit breaker is opened, so that the stability of the transmission system is maintained even before the line circuit breaker LCB1 is tripped after the occurrence of the line fault. After the line circuit breaker LCB1 is tripped, the parallel damping resistor DBRP1 is connected to the power source system G.

When the fault is removed and the transmission line L1 resumes normal operation, the line circuit breaker is reclosed. In such a case, when a reclosing condition is obtained, the parallel resistor circuit breaker RCBP1 is tripped and then the series resistor circuit breaker RCBS1 is closed, so that both damping resistors DBRS1 and DBRP1 are disconnected from the power source system G.

The above explanation has been made with respect to the arrangement of the stabilizing equipment for the first transmission line L1 in FIG. 2, in which the numerical suffix or line number suffix "1" of the reference code means the first line side in the power transmission system. A similar notation is applicable to the arrangement of the stabilizing equipment for the second transmission line L2, so that a similar reference code, in which the numerical suffix "1" is replaced by "2", is used with respect to the line L2. The stabilizing equipment for the second transmission line L2 operates in the same manner as mentioned above, and therefore the explanation relating to the second transmission line L2 is omitted here.

Figure 3:
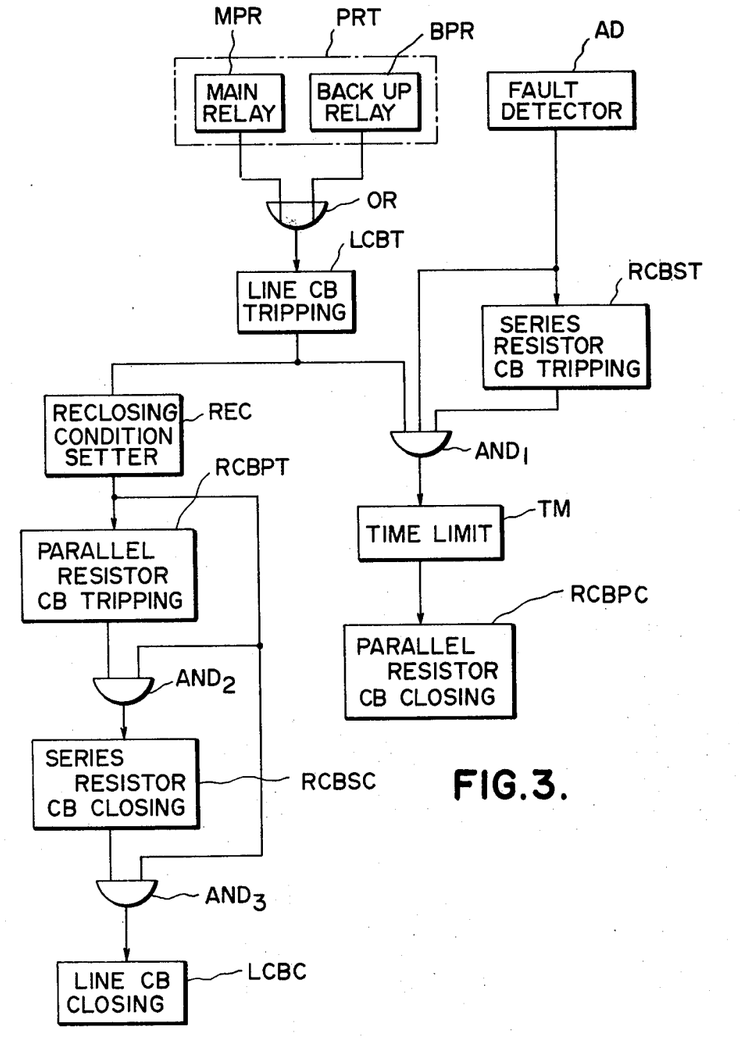
FIG. 3 is a block diagram showing a control circuit of a stabilizing equipment according to the invention.

One embodiment of a detailed arrangement of the circuit breaker control circuit is shown in FIG. 3, wherein the above-mentioned line number suffix "1" or "2" is deleted for the convenience of explanation. In FIG. 3, the main tripping command from the main protective relay MPR and the back up tripping command from the back up protective relay BPR are applied to a tripping mechanism LCBT of the line circuit breaker LCB through an OR circuit OR. When the line circuit breaker LCB is tripped, the tripping mechanism LCBT produces a trip operation signal, which is applied to an AND circuit AND1 and to a reclosing condition setter REC. The AND circuit AND1 also receives the fault detection signal from the fault detector AD and a trip operation signal from a tripping mechanism RCBST of the series resistor circuit breaker RCBS, to which the fault detection signal is applied as a tripping command from the fault detector AD. The output from the AND circuit AND1 is applied to a time limit element TM in order to delay the output by a predetermined time period. The time limit element TM produces a closing command which is applied to a closing mechanism RCBPC of the parallel resistor circuit breaker RCBP.

On the other hand, the reclosing condition setter REC starts measuring a time period when the setter REC receives the trip operation signal and produces a reclosing command at the time that reclosing conditions are satisfied. The reclosing command is supplied to a tripping mechanism RCBPT of the parallel resistor circuit breaker RCBP and to AND circuits AND2 and AND3. When the parallel resistor circuit breaker RCBP is tripped, the tripping mechanism RCBPT produces a trip operation signal, which is applied to the AND circuit AND2. The output from the AND circuit AND2 is applied to a closing mechanism RCBSC of the series resistor circuit breaker RCBS. When the series resistor circuit breaker RCBS is closed, the closing mechanism RCBSC produces a close operation signal, which is applied to the AND circuit AND3. The output from the AND circuit AND3 is applied to a closing mechanism LCBC of the line circuit breaker LCB. In this way, the reclosing command is applied to the tripping mechanism RCBPT of the parallel resistor circuit breaker RCBP, to the closing mechanism RCBSC of the series resistor circuit breaker RCBS and to the closing mechanism LCBC of the line circuit breaker LCB in this time sequence via AND circuits AND2 and AND3. These AND circuits AND2 and AND3 function to interlock the closing mechanism RCBSC with the tripping mechanism RCBPT and the closing mechanism LCBC with the closing mechanism RCBSC during the reclosing steps.

Operations of the stabilizing equipment shown in FIG. 2 will be explained hereinafter with reference to FIGS. 4A, 4B and 4C, which show the timings of the closing and tripping of the line circuit breaker LCB1, the series resistor circuit breaker RCBS1 and the parallel resistor circuit breaker RCBP1, respectively.

Figure 4A:
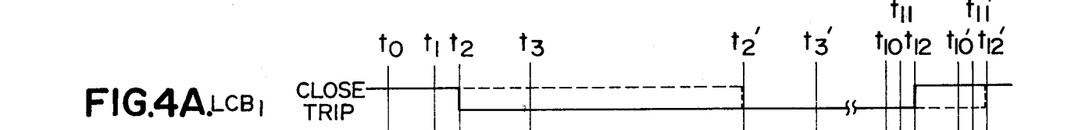
FIGS. 4A, 4B and 4C are timing diagrams explaining the operations of respective circuit breakers in FIG. 2.
Figure 4B:
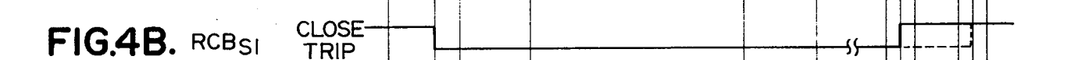
Figure 4C:
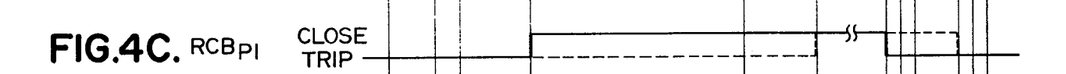

Assume that a ground fault has occurred at a point A (in FIG. 2) of the first transmission line L1 at an instant t0 shown in FIGS. 4A, 4B and 4C, and that the main protective relay MPR1 operates in the normal manner. The ground fault is swiftly detected by both of the main protective relay MPR1 and the fault detector AD1 within approximately one cycle from the instant t0. Then the tripping command from the main protective relay MPR1 is supplied to the tripping mechanism LCBT and to the control circuit CBC1 at the same time. If a high speed circuit breaker whose closing operation as well as tripping operation are completed within approximately one cycle of the frequency of the power source system G is used as the series resistor circuit breaker RCBS1, this high speed circuit breaker RCBS1 is tripped at the instant t1, as shown in FIG. 4B, which is approximately two cycles later than the instant t0, while the line circuit breaker LCB1 is tripped at an instant t2, as shown in FIG. 4A, which is approximately one cycle after the instant t1. That is to say, the series resistor circuit breaker RCBS1 is tripped faster than the line circuit breaker LCB1.

When the series resistor circuit breaker RCBS1 is opened, the series damping resistor DBRS1 is released from its short-circuited condition and is inserted in series with the line L1. While the output from the power source system G is decreased because of the ground fault on the transmission line L1, the series damping resistor DBRS1 thus inserted absorbs some part of the output from the power source system G through the fault point A. In this case, the resistance value of the damping resistor DBRS1 is adjusted by the resistance adjustor RC1 in such a way that the corresponding capacity of the damping resistor DBRS1 is equal approximately to the power transmitted through the transmission line L1 in advance of the occurrence of the ground fault, so that the output from the power source system G which has been transmitted through the line L1 is conducted to the series damping resistor DBRS1. In other words, the transmission line L1 is taken over by the series damping resistor DBRS1. Accordingly, a sudden decrease of the output from the power source system G due to the fault on the transmission line L1 is compensated by the series damping resistor DBRS1 which was inserted in series with the transmission line L1 within an extremely short period of time following occurrence of the fault, so that the output variation of the power source system G can be made small. As a result, the acceleration of a generator or a group of generators included in the power source system G can be suppressed and thus the power source system G is prevented from becoming instable.

In the above-mentioned assumed condition, the main protective relay MPR1 of the protective relay equipment PRT1 operates normally and produces the tripping command to the line circuit breaker LCB1, so that this line circuit breaker LCB1 is opened at the instant t2 (shown in FIG. 4A), which is approximately three cycles after from the occurrence of the fault, to interrupt the transmission line L1 from the power source system G. When the line circuit breaker LCB1 is opened, one end of the series damping resistor DBRS1 is open-ended, so that this damping resistor DBRS1 does not contribute to an increase in the stability of the system.

On the other hand, the AND circuit AND11 (FIG. 3) produces the AND output at the instant t2 at which the line circuit breaker LCB1 is interrupted, so that the time limit element TM1 is triggered by this AND output to start its operation or time measurement. The time limit element TM1 produces the closing command after a predetermined period of time from the instant t2. This closing command is supplied to the closing mechanism RCBPC1 of the parallel resistor circuit breaker RCBP1, and then this circuit breaker RCBP1 is closed at the instant t3, as shown in FIG. 4C, so that the parallel damping resistor DBRP1 is connected in parallel with the transmission line L1. As a result of this parallel connection of the damping resistor DBRP1 to the line L1, this damping resistor DBRP1 starts absorbing the output from the power source system G. In this case, the resistance value of the damping resistor DBRP1 is also adjusted by the resistance adjustor RC1 in such a way that the corresponding capacity of the damping resistor DBRP1 is approximately equal to the power transmitted through the transmission line L1 in advance of the occurrence of the fault, so that the output variation of the power source system G is made small. Accordingly, the acceleration of the generator(s) included in the power source system G is kept suppressed and thus the power source system G maintains its stable operation even during the transient period of time after the occurrence of the fault.

The reclosing condition setter REC1 (FIG. 3) starts its operation when the trip operation signal is derived from the tripping mechanism LCBT1 of the line circuit breaker LCB1 and the reclosing command is produced at an instant t10 at which the reclosing conditions are satisfied after the lapse of a predetermined time from the instant t2 at which the line circuit breaker LCB1 is tripped. The reclosing command is applied to the tripping mechanism RCBPT1 of the parallel resistor circuit breaker RCBP1, the closing mechanism RCBSC1 of the series resistor circuit breaker RCBS1 and the closing mechanism LCBC1 of the line circuit breaker LCB1 sequentially, so that the parallel resistor circuit breaker RCBP1 is opened at the instant t10 and subsequently the circuit breakers RCBS1 and LCB1 are closed at an instant t11 and at an instant t12, respectively. As a result, both of the damping resistors DBRS1 and DBRP1 are disconnected from the transmission line L1 and thereafter the line circuit breaker LCB1 is reclosed.

In the case that the main protective relay MPR1 fails to operate (for example, fails to detect the fault) and that the fault line L1 is interrupted by the back up protective relay BPR1, the respective circuit breakers LCB1, RCBS1 and RCBP1 operate as shown by dotted lines in FIGS. 4A, 4B and 4C. The line circuit breaker LCB1 is tripped to interrupt the line L1 at an instant t2' which is approximately after 16 cycles from the instant t0 of the occurrence of the fault. Then, the parallel resistor circuit breaker RCBP1 is closed at an instant t3' after the lapse of the predetermined period of time from the instant t2'. Here, this predetermined time period from t2' to t3' is determined by the time limit element TM1 and is equal to the time period from t2 to t3. The reclosing command is obtained from the reclosing condition setter REC1 at an instant t10' at which the reclosing conditions are satisfied after the lapse of the predetermined time from the instant t2'. Then, the parallel resistor circuit breaker RCBP1 is tripped at the instant t10' and subsequently the series resistor circuit breaker RCBS1 and the line circuit breaker LCB1 are closed at an instant t11' and at an instant t12', respectively, to complete reclosing the transmission line L1. These sequential reclosing steps are the same as those in the case of the above-mentioned main protection.

Further, as described above, the parallel resistor circuit breaker RCBP1 is closed with the predetermined time delay (t3-t2) or (t3'-t2') from the tripping instant t2 or t2' of the line circuit breaker LCB1. This predetermined time delay is provided for the purpose of compensating for the output variation of the power source system G due to a slight delay in the connection of the series damping resistor DBRS1 after the occurrence of the fault. This time delay can be determined in accordance with the transient characteristics of the power source system G and the transmission lines L1 and L2 or the like.

In the case of the main protection, the series damping resistor DBRS1 is inserted only one cycle in advance of the tripping of the line circuit breaker LCB1 and therefore the stabilization effect resulting from the sequential connections of the series and parallel damping resistors RCBS1 and RCBP1 to the transmission line L1 according to this invention is comparable to that resulting from the stabilizing equipment of the prior art in which only the parallel damping resistor DBR is connected to the transmission line L1. In the case of the back up protection, compared with the above main protection, the line circuit breaker LCB1 is not tripped until the back up protective relay BPR1 operates, so that the transient stability is remarkably improved by the series damping resistor DBRS1.

More specifically, the back up protective relay BPR1 produces a considerably delayed tripping command, in comparison with the tripping command from the main protective relay MPR1, so that the transmission line L1 is interrupted approximately 16 cycles after the occurrence of the fault or from the instant t0 by the back up protective relay BPR1, while the series damping resistor DBRS1 is inserted within two cycles from the instant t0. Accordingly, even if the tripping of the line circuit breaker LCB1 is delayed, the series damping resistor DBRS1 can limit the output variation of the power source system G to a slight amount until the transmission line L1 is opened by the line circuit breaker LCB1. In this way, according to this invention, the acceleration of the generators included in the power source system G is suppressed to maintain the stabilized operations.

According to this invention, as mentioned in the above, the series damping resistor DBRS1 is first inserted in series with the fault transmission line L1 soon after the occurrence of the fault and before the tripping of the line circuit breaker LCB1 and then the parallel damping resistor DBRP1 is connected in parallel with the fault transmission line L1 after the opening of the line circuit breaker LCB1, regardless of the main or back up protection, so that the series damping resistor DBRS1 can suppress the acceleration of the generator or the group of generators in the power source system G and accordingly the transient stability of the power source system G is improved. Moreover, when n transmission lines are connected to a single power source system G, it is sufficient that the damping resistors DBRS1 and DBRP1 provided for each transmission line have resistance values, each of which corresponds to a capacity of 1/n of the overall output capacity of the power source system G. In other words, the total capacity of the damping resistors for the n transmission lines should be equal to the overall output capacity of the power source system G, so that the stabilizing equipment for each of the transmission lines can be constructed with less cost. Furthermore, the capacity of the damping resistor is adjusted in response to the power actually transmitted through the transmission line at every instant by the resistance adjustor RC1, so that the stabilizing equipment according to this invention can improve the transient stability over a wide load range, regardless of the amount of the load.

While, in the above embodiment of this invention, use is made of the series and parallel damping resistors in a separate form, these series and parallel damping resistors may be replaced by a single or common damping resistor with a slight modification of the connection of the series and parallel resistor circuit breakers.

Figure 5:
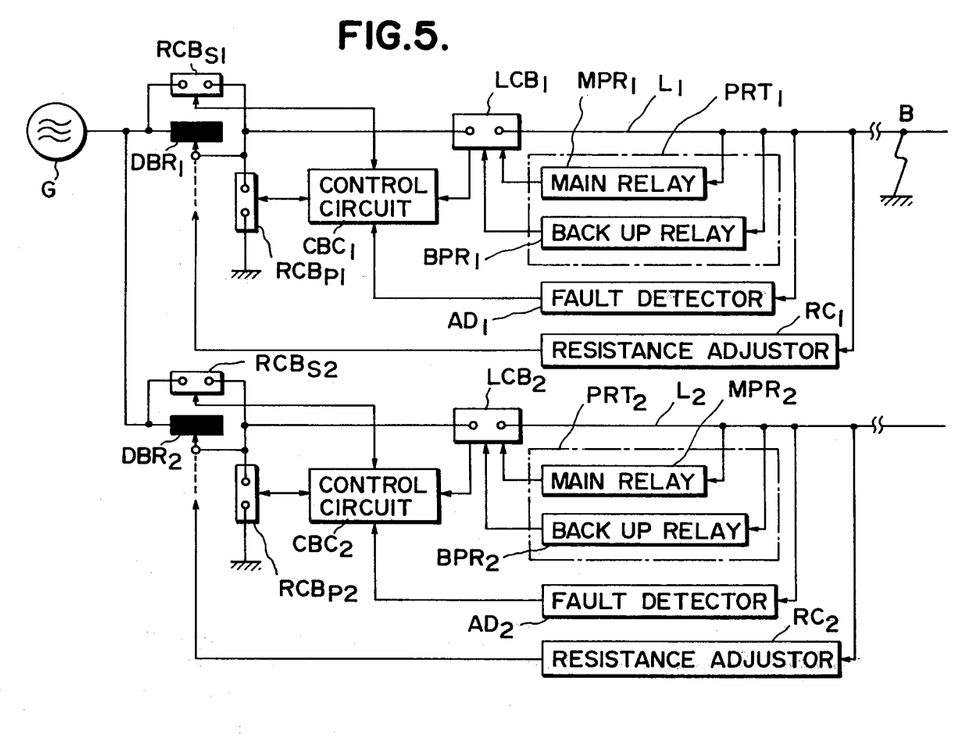
FIGS. 5, 6 and 7 are single line connection diagrams showing second, third and fourth embodiments of this invention, respectively.

FIG. 5 shows a second embodiment of this invention in which only common damping resistors DBR1 and DBR2 are used instead of the above-mentioned series and parallel damping resistors. Explanation will be made only with respect to the first transmission line L1, hereinafter. Other parts corresponding to the like parts in FIG. 2 are denoted by the same reference codes as in FIG. 2. The stabilizing equipment shown in FIG. 5 is different from that shown in FIG. 2 in that one terminal of the parallel resistor circuit breaker RCBP1 is connected to the load side terminal (or the terminal of the line circuit breaker side) of the series resistor circuit breaker RCBS1, instead of the power source side terminal thereof and that the other terminal of the parallel resistor circuit breaker RCBP1 is grounded. The above-mentioned one terminal of the parallel resistor circuit breaker RCBP1 is also connected to an adjusting terminal of the damping resistor DBR1 which is controlled by the resistance adjustor RC1.

When each transmission line is normal in this arrangement, the series resistor circuit breakers RCBS1 and RCBS2 are closed and the parallel resistor circuit breakers RCBP1 and RCBP2 are opened, as in the first embodiment of this invention shown in FIG. 2. As a result, the common damping resistors DBR1 and DBR2 are separated from the respective transmission lines L1 and L2. In the meantime, when a fault occurs at a point B on the transmission line L1, as shown in FIG. 5, the series resistor circuit breaker RCBS1 is tripped under the control from the circuit breaker control circuit CBC1 which receives the fault detection signal from the fault detector AD1 prior to the tripping of the line circuit breaker LCB1, so that the common damping resistor DBR1 is inserted in series with the fault transmission line L1. As a result, the common damping resistor DBR1 absorbs the output power from the power source system G via the fault point B on the transmission line L1. Thereafter, if the parallel resistor circuit breaker RCBP1 is closed after the line circuit breaker LCB1 is tripped by the protective relay equipment PRT1, then the common damping resistor DBR1 is switched so as to be connected in parallel with the power source system G, since the load side terminal of the common damping resistor DBR1 is grounded through the parallel resistor circuit breaker RCBP1. In the reclosing steps of the line circuit breaker LCB1, the series resistor circuit breaker RCBP1 is closed and the parallel resistor circuit breaker RCBP1 is opened so that the common damping resistor DBR1 is separated from the transmission line L1 before the line circuit breaker LCB1 is reclosed.

In such a manner, even in the second embodiment of this invention shown in FIG. 5, the opening and closing controls of the respective circuit breakers LCB, RCBS and RCBP are the same as those in the first embodiment shown in FIG. 2 and thus the circuit breaker control circuit CBC as shown in FIG. 3 can be employed in this second embodiment.

As mentioned above, when the fault occurs, the common damping resistor DBR1 is connected in series with the line L1 before the interruption of the line circuit breaker LCB1 and then in parallel of the power source system G after the interruption of the line circuit breaker LCB1, so that the sudden output variation of the power source system otherwise caused by the fault on the transmission line L1 can effectively be compensated prior to the interruption of the line L1. Accordingly, the acceleration of the generator in the power source system G can be suppressed by this second embodiment, like the first embodiment shown in FIG. 2. It follows that stable operations are maintained and that the transient stability of the power transmission system is improved. In addition, the single damping resistor is used both as the series and parallel damping resistors by switching or changing the connection of the single damping resistor in FIG. 5, so that the cost of the stabilizing equipment can be reduced by the second embodiment, as compared with the first embodiment shown in FIG. 2.

Figure 6:
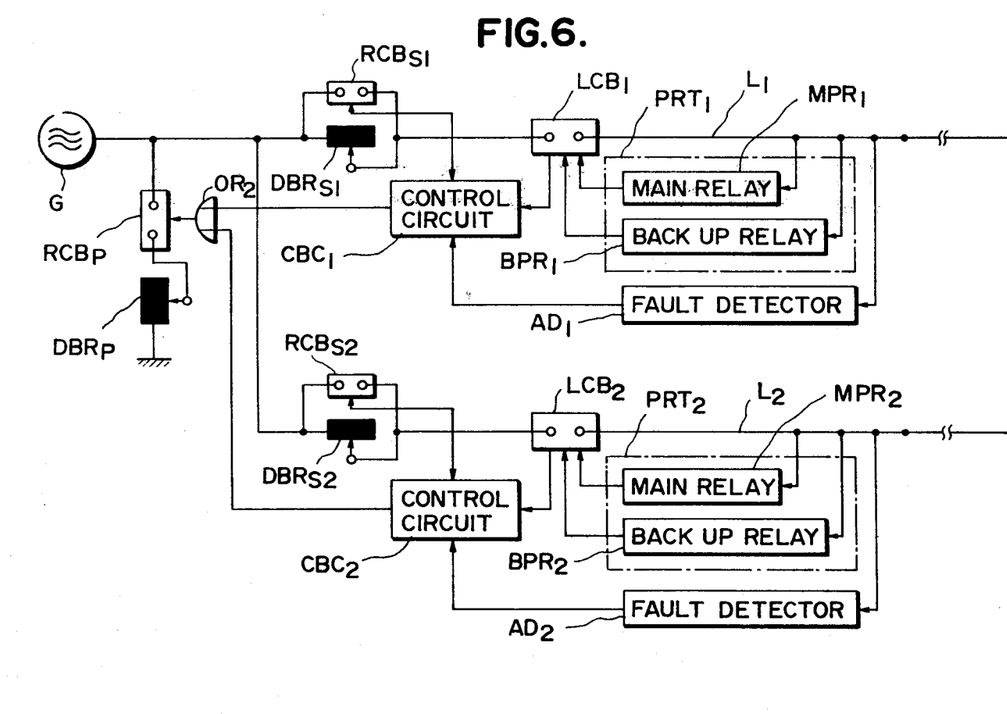

FIG. 6 shows a third embodiment of this invention in which most of the parts similar to the corresponding parts in FIG. 2 are shown by the same reference codes. In FIG. 6, the arrangement of the resistance adjustor is omitted for simplicity of explanation. Here in FIG. 6, there is provided only one series circuit of a parallel circuit breaker RCBP and a parallel damping resistor DBRP with respect to all of the transmission lines L1 and L2. The series circuit is connected to the power source system G at the side where all of the series circuit breakers RCBS1 and RCBS2 are connected in common. The parallel circuit breaker RCBP is controlled through an OR circuit OR2 by either one of the circuit breaker control circuit CBC1 and CBC2 which may be arranged as shown in FIG. 3. This third embodiment can reduce the cost of the stabilizing equipment, since only one series circuit is used in common to all of the transmission lines, and thus this embodiment is useful in the case where a number of transmission lines are connected to the power source system.

Figure 7:
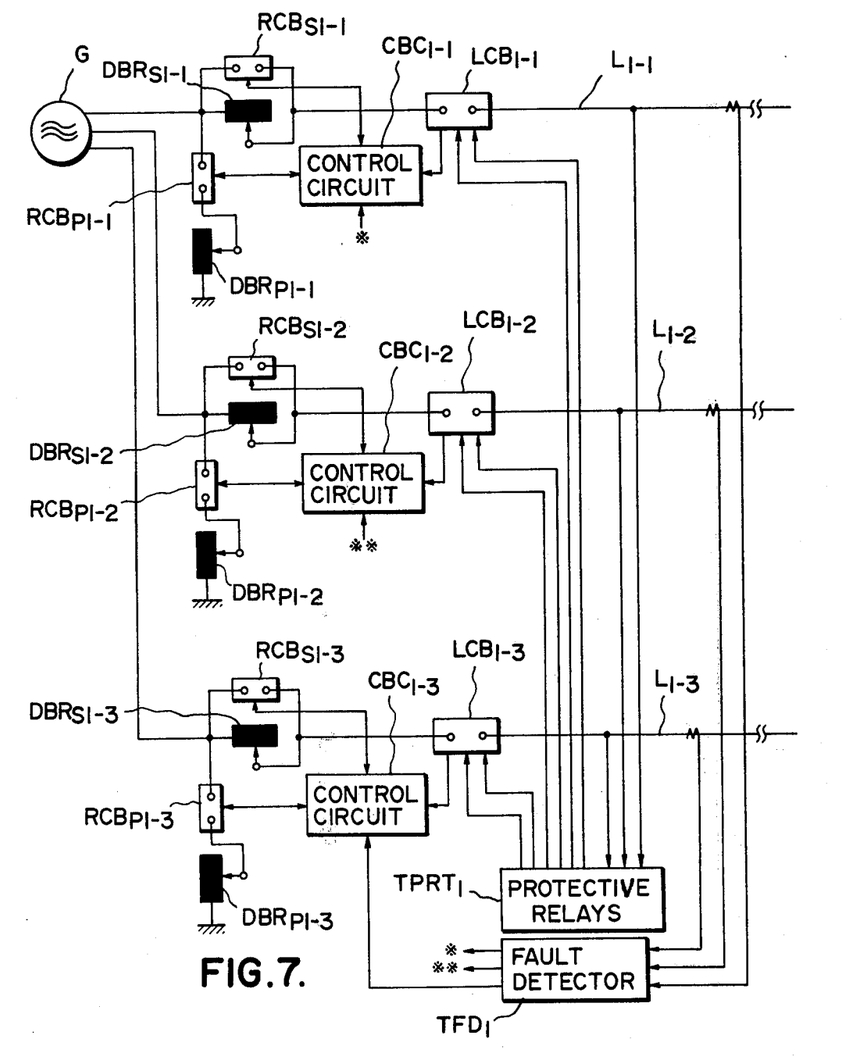

In the foregoing, at least the series damping resistors are provided for the respective transmission lines. In addition, the series and parallel damping resistors may be allotted to the respective ones of the three phase conductors of one transmission line. FIG. 7 shows a fourth embodiment of this invention embodying the above-mentioned allocation of the damping resistors. In FIG. 7, each reference code has two numeral suffixes, in which the first suffix denotes the number of the transmission line and the second suffix denotes the phase of that transmission line. The circuit arrangement with respect to each of the phases in FIG. 7 corresponds to the circuit arrangement with respect to each of the transmission lines in FIG. 2, other than a three phase protective relay equipment TPRT1 and a three phase fault detector TFD1. The three phase protective relay equipment TPRT1 receives three phase voltage and current values from the respective phases L1-1, L1-2 and L1-3 of the transmission line L1 and produces three phase tripping commands from three phase main and back up protective relays (not shown, but included in the block TPRT1 in FIG. 7) which are applied to three phase line circuit breakers LCB1-1, LCB1-2 and LCB1-3, respectively and to three phase circuit breaker control circuits CBC1-1, CBC1-2 and CBC1-3, respectively. The three phase fault detector TFD1 receives the three phase current values via, for example, independent current transformers and detects selectively a line fault or faults of the respective phases L1-1, L1-2 and L1-3 of the transmission line L1 such as a one phase ground fault, two phase ground fault or the like. The three phase fault detector TFD produces fault detection signals relating to the respective three phases, independently, which are applied to the circuit breaker control circuit CBC1-1, CBC1-2 and CBC1-3. Further, in this embodiment, the circuit breakers LCB1-1, LCB1-2, LCB1-3; RCBS1-1, RCBS1-2, RCBS1-3; RCBP1-1, RCBP1-2, RCBP1-3 are tripped or closed selectively in response to the gripping command or commands of the respective phases from the three phase protective relay equipment TPRT1. According to this embodiment shown in FIG. 7, when an unbalanced fault such as a one phase ground fault, two phase ground fault or the like occurs on the transmission line, the damping resistors are connected selectively to the fault phase(s) only, so that the transient stability of the power source system can be improved also in the event that an unbalanced fault occurs.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A stabilizing equipment for a power transmission system having a power source system, at least one transmission line and at least one line circuit breaker inserted between said power source system and said transmission line for interrupting said transmission line when a fault occurs on said transmission line, said stabilizing equipment comprising:
    a fault detector for detecting said fault,
    a series damping resistor for connection in series with said line circuit breaker,
    first means for inserting said series damping resistor between said power source system and said line circuit breaker before said line circuit breaker is interrupted and after said fault is detected by said fault detector,
    a parallel damping resistor,
    second means for inserting said parallel damping resistor between said power source system and ground after said line circuit breaker is interrupted, and
    third means for separating said parallel damping resistor first and subsequently said series damping resistor before said line circuit breaker is reclosed after reclosing conditions are satisfied.

2. A stabilizing equipment as claimed in claim 1, wherein said stabilizing equipment is provided for each of a plurality of transmission lines.

3. A stabilizing equipment as claimed in claim 1, wherein said first means has a first circuit breaker connected in parallel with said series damping resistor;
    said second means has a second circuit breaker connected in series with said parallel damping resistor;
    a trip detection signal obtained from said line circuit breaker and a fault detection signal obtained from said fault detector are applied to said first and second means so that said first circuit breaker is tripped at the time that said fault detection signal is applied to said first and second means, and that said second circuit breaker is closed after a predetermined period of time from an instant at which said trip detection signal is applied to said first and second means from said line circuit breaker; and
    said first circuit breaker is closed after said second circuit breaker is tripped and before said line circuit breaker is reclosed after said reclosing conditions are satisfied.

4. A stabilizing equipment as claimed in claim 1 which further comprises main and backup protective relays, said line circuit breaker being controlled by a tripping command obtained from either one of said main and back up protective relays.

5. A stabilizing equipment as claimed in claim 1, wherein said series and parallel damping resistors have variable resistance values, each of which is adjustable by a resistance adjustor for detecting power transmitted from said power source system.

6. A stabilizing equipment as claimed in claim 1, wherein a common damping resistor is inserted as said series and parallel damping resistors between said power source system and said line circuit breaker;
    said first means has a third circuit breaker connected in parallel with said common damping resistor;
    said second means has a fourth circuit breaker inserted between a junction between said common damping resistor and said line circuit breaker and the ground;
    a trip detection signal obtained from said line circuit breaker and a fault detection signal obtained from said fault detector are applied to said first and second means so that said third circuit breaker is tripped at the time that said fault detection signal is applied to said first and second means, and that said fourth circuit breaker is closed after a predetermined period of time from an instant at which said trip detection signals is applied to said first and second means from said line circuit breaker; and
    said third circuit breaker is closed after said fourth circuit breaker is tripped and before said line circuit breaker is reclosed after said reclosing conditions are satisfied.

7. A stabilizing equipment as claimed in claim 1, wherein said transmission line has a plurality of phase conductors, said stabilizing equipment is provided for each of said phase conductors and said fault detector selectively detects a fault on each of said phase conductors.

8. A stabilizing equipment as claimed in claim 1, wherein said first means has a series resistor circuit breaker which is tripped when said series resistor circuit breaker receives a fault detection signal from said fault detector and whose tripping mechanism produces a trip detection signal;
    said second means has a parallel resistor circuit breaker which is closed through a time limit element having a predetermined time delay by an output from a first AND circuit which receives said fault detection signal, said trip detection signal from said tripping mechanism of said series resistor circuit breaker and a trip detection signal from a tripping mechanism of said line circuit breaker; and
    said third means has
        a reclosing condition setter receiving said trip detection signal from said tripping mechanism of said line circuit breaker,
        a tripping mechanism of said parallel resistor circuit breaker receiving a reclosing output from said reclosing condition setter,
        a second AND circuit receiving a trip detection signal from said tripping mechanism of said parallel resistor circuit breaker and said reclosing output,
        a closing mechanism of said series resistor circuit breaker receiving an output from said second AND circuit,
        a third AND circuit receiving a close detection signal from said closing mechanism of said series resistor circuit breaker and said reclosing output, and
        a closing mechanism of said line circuit breaker receiving an output from said third AND circuit.

9. A stabilizing equipment as claimed in claim 1, wherein the resistance value of each of said series and parallel damping resistors corresponds to the capacity of transmitted power.

10. A stabilizing equipment as claimed in claim 2, wherein the resistance value of each of said series and parallel damping resistors with respect to every transmission line corresponds to the capacity of power transmitted through every transmission line.

11. A stabilizing equipment as claimed in claim 3, wherein one parallel damping resistor and one parallel resistor circuit breaker are arranged in common with respect to the respective transmission lines and said parallel resistor circuit breaker is controlled by said second means relating to said respective transmission line.

12. A stabilizing equipment as claimed in claim 3, wherein said first circuit breaker is a high speed circuit breaker in which tripping and closing operations are completed approximately within one cycle of the power source system.

13. A stabilizing equipment as claimed in claim 6, wherein said third circuit breaker is a high speed circuit breaker in which tripping and closing operations are completed approximately within one cycle of the power source system.

14. A stabilizing equipment as claimed in claim 1, wherein said fault detector is an overcurrent relay.

15. A stabilizing equipment as claimed in claim 1, wherein said fault detector is an undervoltage relay.

16. A stabilizing equipment for a power transmission system having a power source system, at least one transmission line having a plurality of phase conductors, and a plurality of line circuit breakers inserted between said power source system and said phase conductors for interrupting said transmission line when a fault occurs on at least one of said phase conductors, said stabilizing equipment comprising:
a fault detector for selectively detecting said fault,
a plurality of series damping resistors,
first means for inserting one of said series damping resistors between said power source system and each of said line circuit breakers before said line circuit breakers are interrupted and after said fault is detected by said fault detector,
a plurality of parallel damping resistors,
second means for inserting said parallel damping resistors between said phase conductors and ground after said line circuit breakers are interrupted, and
third means for separating said parallel damping resistors first and subsequently said series damping resistors before said line circuit breakers are reclosed after reclosing conditions are satisfied.

17. In combination with a power transmission system having at least one power generator, at least one transmission line and at least one line circuit breaker for connecting said power generator to said transmission line and for disconnecting said transmission line from said power generator when a fault occurs on said transmission line, stabilizing equipment comprising:
fault detector means for detecting a fault on said transmission line,
damping resistor means for connection to said line circuit breaker,
first circuit breaker means coupled to said fault detector means for connecting said damping resistor means in series with said power generator and said line circuit breaker when a fault is detected by said fault detector means but before said line circuit breaker is opened,
second circuit breaker means coupled to said fault detector means for connecting said damping resistor means between said power generator and ground after said line circuit breaker has opened, and
means for first disconnecting said damping resistor means and then closing said line circuit breaker after reclosing conditions have been satisfied.

18. Power stabilization equipment as claimed in claim 17 wherein said damping resistor means includes a series damping resistor and a parallel damping resistor, said first circuit breaker means is connected in parallel with said series damping resistor and said second circuit breaker means is connected in series with said parallel damping resistor.

* * * * *